United States Patent
Arnalsteen et al.

(10) Patent No.: US 8,166,995 B2
(45) Date of Patent: May 1, 2012

(54) VALVE FOR THE VENTING CIRCUIT OF A LIQUID TANK

(75) Inventors: Michel Arnalsteen, Groot-Bijgaarden (BE); Vincent Cuvelier, Brussels (BE); Thierry Rouxel, Argentre (FR)

(73) Assignee: Inergy Automotive Systems Research (S.A.), Brussels (BE)

( * ) Notice: Subject to any disclaimer, the term of this patent is extended or adjusted under 35 U.S.C. 154(b) by 451 days.

(21) Appl. No.: 12/438,390

(22) PCT Filed: Sep. 3, 2007

(86) PCT No.: PCT/EP2007/059185
§ 371 (c)(1), (2), (4) Date: Feb. 23, 2009

(87) PCT Pub. No.: WO2008/028887
PCT Pub. Date: Mar. 13, 2008

(65) Prior Publication Data
US 2009/0199908 A1   Aug. 13, 2009

(30) Foreign Application Priority Data

Sep. 4, 2006   (FR) ..................................... 06 07721

(51) Int. Cl.
*F16K 24/04*   (2006.01)
*B21D 51/16*   (2006.01)
(52) U.S. Cl. ........ 137/15.26; 137/43; 137/202; 251/144
(58) Field of Classification Search ............ 137/43, 137/202, 15.19, 15.26
See application file for complete search history.

(56) References Cited

U.S. PATENT DOCUMENTS

| | | | |
|---|---|---|---|
| 4,241,747 A | 12/1980 | King, Sr. | |
| 4,982,757 A | 1/1991 | Ohasi et al. | |
| 5,234,013 A * | 8/1993 | Roetker et al. | 137/43 |
| 5,566,705 A * | 10/1996 | Harris | 137/43 |
| 5,927,317 A | 7/1999 | Hsia | |
| 6,612,324 B2 * | 9/2003 | Szlaga | 137/202 |
| 7,418,975 B2 * | 9/2008 | Nojiri et al. | 137/202 |
| 7,571,740 B2 * | 8/2009 | Kaneko et al. | 137/202 |
| 7,900,648 B2 * | 3/2011 | Rouxel et al. | 137/202 |
| 2002/0074037 A1 | 6/2002 | Enge | |
| 2004/0211465 A1 | 10/2004 | Miyoshi et al. | |

FOREIGN PATENT DOCUMENTS

| | | |
|---|---|---|
| DE | 10020834 A1 | 11/2000 |
| EP | 1172306 A1 | 1/2002 |
| WO | WO2006125758 A1 | 11/2006 |

* cited by examiner

*Primary Examiner* — Kevin Lee
(74) *Attorney, Agent, or Firm* — Oblon, Spivak, McClelland, Maier & Neustadt, L.L.P

(57) ABSTRACT

Valve for the venting circuit of a liquid tank, the valve comprising a chamber which includes openings that allow liquid to penetrate into the chamber above a certain level in the tank and/or in the event of waves in the tank or the tank being turned upside down, a cover for the chamber including an aperture that is susceptible to open into the venting circuit of the tank, and a float comprising a body and a needle that close off the aperture, the float being able to slide vertically inside the chamber depending on the level of liquid therein, the needle of the float being frustoconical-shaped and based on an elastomeric material.

12 Claims, 6 Drawing Sheets

VALVE FOR THE VENTING CIRCUIT OF A LIQUID TANK

CROSS-REFERENCE TO RELATED APPLICATIONS

This application is a U.S. national stage application under 35 U.S.C. §371 of International Application No. PCT/EP2007/059185 filed Sep. 3, 2007, which claims priority to French Application No. FR06.07721 filed Sep. 4, 2006, these applications being herein incorporated by reference in their entirety for all purposes.

BACKGROUND OF THE INVENTION

The present invention relates to a valve for the venting circuit of a liquid tank, in particular a fuel tank with which a motor vehicle may be equipped.

Liquid tanks, in particular fuel tanks for motor vehicles, are nowadays generally provided inter alia with a venting circuit. This circuit allows air to be introduced into the tank in the event of underpressure (especially for compensating for the volume of liquid consumed) or allows the gases contained in the tank to be removed in the event of overpressure (especially in the event of overheating). This circuit also allows the channelling and possible filtering of the gases that have to be discharged into the atmosphere, for the purpose of meeting the ever stricter environmental requirements in this regard.

The venting circuit includes, in a known manner, at least one valve that prevents, as far as possible, liquid from the tank being expelled in the event of the tank being turned upside down or at an excessively high tilt angle. This venting valve must provide a rapid and reliable response when its operating conditions arise, but with minimal sensitivity to transient phenomena such as in particular very high flow rates, overpressure in the tank or low-amplitude waves. It must also ensure that there is minimal liquid carried over into the canister (or the chamber containing a substance, usually activated carbon, which adsorbs the fuel vapours) in normal operation and when filling, for fear of saturating said canister and making the decontamination of the gases discharged into the atmosphere ineffective. This phenomenon is generally called LCO (Liquid Carry Over) in the jargon of the field. Finally, this valve may also carry out the role of vacuum release.

Many venting valves employ a float having an upper needle or tip which closes off an aperture for connecting the tank to the venting circuit. In this type of valve, the functions of vacuum release and LCO limitation may be provided by a suitable geometry of the valve itself or by a separate device, joined to the valve by a section of the ventilation line. Thus, Patent EP 1172306 in the name of the Applicant relates to a float vent valve attached to which is a drainable container (or DC) provided with an umbrella valve capable of opening both to discharge the liquids trapped in the container and in the event of underpressure in the tank.

One problem facing the suppliers of fuel systems to motor vehicle manufacturers is being able to meet the various specifications of these manufacturers with a reasonable range of components. These specifications state quantities such as the ventilation pressure and flow rate; the re-opening pressure of the ventilation valves; the leakage rates tolerated; the possibility of overcoming potential underpressure, etc. which have to be met and which vary from one geographical region to another, and often even from one manufacturer to another.

Regarding the leakage rates, it is important, with the float valves as described previously, that the closure of the aperture is leaktight when the valve is in the closed position. Thus, U.S. Pat. No. 4,982,757 proposes a two-stage valve with double sealing, this being due to an intermediate part that can be moved both with respect to the float and the aperture to be closed off (valve seat) and itself comprising an aperture capable of being closed off by the tip of the float, this aperture being of a smaller size than that of the main aperture (valve seat). This intermediate part comprises an elastomeric part both on its lower and upper faces in order to obtain double sealing (i.e. a leaktight closure both of the main aperture (valve seat) and of the secondary aperture (in the intermediate part)). One drawback of the valves described in that patent lies precisely in the fact that they are specific to a given specification and that, in particular, the dimensions of the apertures and elastomeric parts must be adapted on a case-by-case basis.

BRIEF SUMMARY OF THE INVENTION

The present invention aims to solve this problem by providing a modular valve composed of an assembly of several parts, some of which are common to all valves, regardless of the specification that they are meant to meet, and others are interchangeable or even optional.

The invention thus relates to a valve for the venting circuit of a liquid tank, said valve comprising:
a) a chamber (susceptible to open into the tank) which comprises openings that allow liquid to penetrate into the chamber above a certain level in the tank and/or in the event of waves in the tank or the tank being turned upside down;
b) a cover for the chamber comprising an aperture that is susceptible to open into the venting circuit of the tank;
c) a float comprising a body and a needle capable of closing off the aperture, said float being able to slide vertically inside the chamber depending on the level of liquid therein, the needle of the float being frustoconical-shaped and based on an elastomeric material.

Such a valve design specifically makes it possible to keep the chamber and the float the same for a whole series of valves, and to vary only the cover and the dimensions and/or the shape of the associated aperture as a function of the specifications of the manufacturers. This is because, depending on the size of the aperture, its line of contact on the frustoconical surface of the needle will vary but good leaktightness will still be obtained given the elastomeric nature of the needle.

Therefore, the present invention also relates to a process for manufacturing a series of valves as described above having ventilation characteristics that are variable (mainly the flow rate) and are adapted to different specifications, according to which the chamber and float are kept the same whatever the specifications and only the cover, and the dimensions and/or the shape of the aperture as a function of these, are varied.

BRIEF DESCRIPTION OF THE SEVERAL VIEWS OF THE DRAWINGS

The invention is illustrated non-limitingly by FIGS. 1 to 5, where.

DETAILED DESCRIPTION OF THE INVENTION

Figure 1:
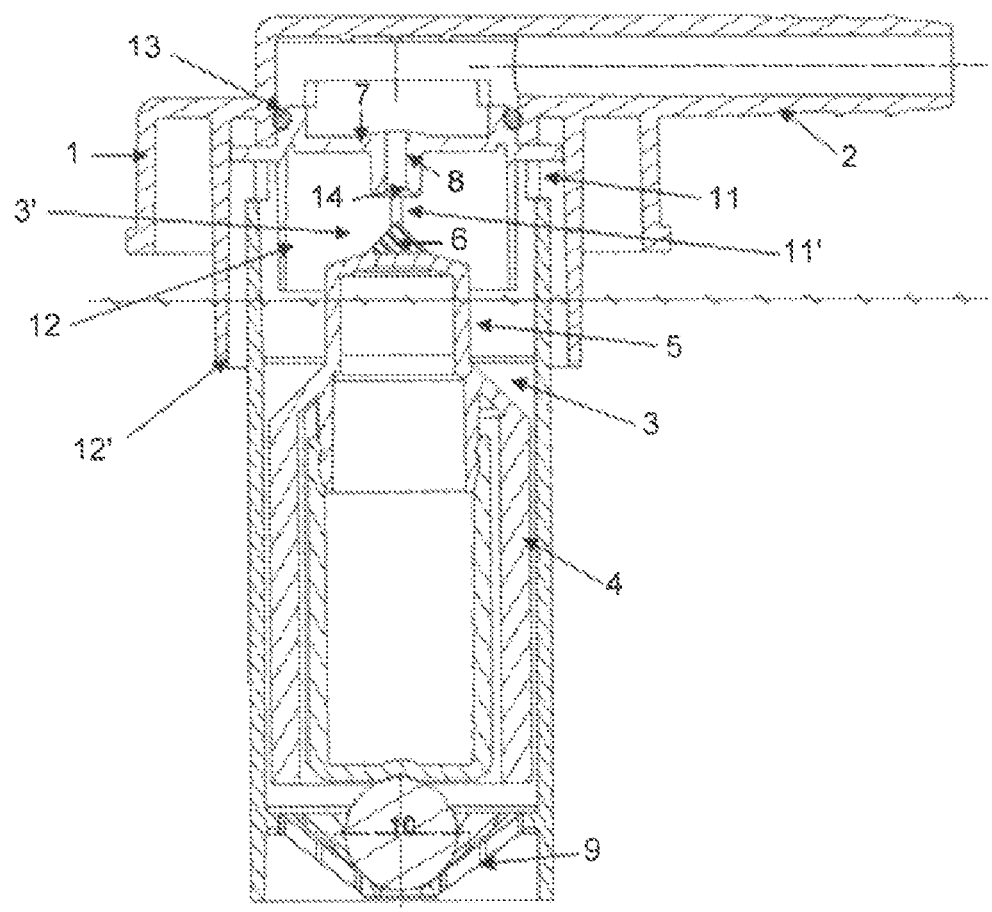
FIG. 1 shows an axial cross section through a single-stage venting valve according to the invention having a 2 mm ventilation aperture, in the open position.

The valve according to the invention is intended for the venting circuit of a tank, which may contain any liquid. In particular, the liquid may be a fuel, a brake fluid or a lubricant. More particularly, the liquid is a fuel. The tank may be intended for any use, especially for equipping a vehicle and more especially for equipping a motor vehicle.

The valve according to the invention comprises a float composed of a body and a needle intended for closing off the ventilation or venting aperture. It also comprises a chamber of any shape, internally adapted to the sliding of the float. For this purpose, it usually has a constant internal cross section, at least in the part where the body of the float has to be able to slide. In particular, at least in this part, the chamber is internally cylindrical.

The external (lateral) shape of the body of the float is obviously matched to that of the inside of the chamber in which it has to be able to slide. Therefore in general it has a generally cylindrical external shape. However, when the chamber comprises an internal baffle, the head of the float which bears the needle preferably has a size and geometry such that it can slide inside this baffle, while the body of the float cannot do so. Such a variant is covered by Application PCT/EP2006/062479 in the name of the Applicant, the content of which is incorporated by reference in the present application.

The chamber of the valve according to the invention includes a seat used as a support for the float when the latter is in the low position. Advantageously, it is an apertured plate or apertured frustoconical dish. The term "apertured" is understood to mean having several openings that allow liquid to flow through the dish in order to allow the valve to fulfil its function. In particular, the frustoconical dish or the plate include a central aperture. When the liquid level rises in the tank, this liquid penetrates the valve via the lower part, through the openings in the frustoconical dish or the plate, forces the float upwards and also causes the needle to close off the aperture located in the head (cover) of the valve.

In a preferred embodiment, the chamber of the valve according to the invention has, in its upper part, one or more lateral openings for flow of the gases, and therefore providing the degassing/venting function of the valve. The term "gas" is understood in particular to mean the external air that has to be introduced into the tank or the gas mixtures contained in the tank, the removal of which has to be possible. In the case of a fuel tank, these gas mixtures comprise essentially air, and fuel vapour.

Advantageously, the lateral openings in the chamber are small in size, so as to prevent the flow of substantial volumes of liquid, in particular by throttling. Each opening typically has an area between 10 and 20 mm. There is therefore generally a total area between 20 and 40 mm since a configuration having two diametrically opposed windows is preferred.

In particular, these lateral openings have an elongate rectangular cross section. Advantageously, there are at least two of these openings. This is because a single window could be blocked (by liquid fuel) at the moment when the valve reopens, for example when the tank is tilted. In this case, the risk of liquid fuel being carried over is very high, since the pressure has risen in the tank and, upon re-opening, the gas flow rate is high. Complete blockage is avoided with at least two diametrically opposed apertures.

In the advantageous variant according to which the valve comprises an internal baffle, this is preferably also provided with at least two lateral openings. This is because the liquid that is stopped by the baffle flows along the latter in order to drain downwards. Therefore, if the gas stream can get past the baffle only via the bottom, it will again sweep over the droplets and therefore carry them over.

More particularly preferably, these openings are offset with respect to those of the main chamber. The variant according to which the openings in the internal baffle are also diametrically opposed, and staggered with those of the chamber (i.e. the four openings are arranged crosswise, at 90° to one another), gives good results.

The aforementioned openings in the internal baffle may be located anywhere on it. However, slots starting from the bottom of this baffle give good results because they help in the settling (draining) of the trapped liquid. These slots may even be present over more than half of the height of the baffle, or even more than ¾ of its height.

Positioning gas flow openings in the upper part of the chamber very substantially reduces the possible impact on these openings of the liquid level and of its movements, thus allowing venting even in certain critical situations. This impact may also, when required, be reduced by the use of at least one external baffle placed facing some of the openings and preferably all of them.

This may be a single baffle having a substantially annular cross section, surrounding the head of the valve. Or alternatively, it is possible to use a succession of baffles, each facing one or more openings. Preferably, it is a single baffle, preferably one that is annular and provided with openings. As for the internal baffle, this external baffle preferably comprises at least two diametrically opposed openings, preferably offset with those of the chamber and in particular staggered with respect to them.

It follows from the foregoing that in one advantageous variant of the valve according to the invention, the openings of the internal and external baffles are arranged crosswise with respect to those of the main chamber. This geometry prevents direct flow between the various partitions and therefore creates an optimal labyrinth effect.

In the valve according to this variant of the invention, these baffles may be moulded as one part with the chamber, or with its cover, or else with an additional part optionally used as a coupling between the valve according to the invention and a ventilation line. According to one particularly preferred variant, the internal baffle is produced as one part with the valve cover. Regarding the external baffle, it is preferably produced as one part with a coupling between the valve according to the invention and a ventilation line.

The valve cover according to the invention may be realized in one piece with the chamber or may be a separate piece assembled with said chamber, this latter variant being preferred. This valve cover may be composed of one piece (generally either flat and solid, or thicker and hollow) or of at least 2 pieces assembled generally providing a space between them.

One important aspect of the operation of the valve according to the invention is that linked to the cooperation between the elastomer-based frustoconical needle and the ventilation aperture in the cover. Generally, the ventilation aperture comprises a cylindrical section having a circular cross section with a diameter ranging from 0.65 mm, 1 mm or even 2 mm (generally for American systems) to 4 mm (generally for French and German systems), optionally to a diameter of 3 mm for certain Asian (especially Korean) systems. This aperture has an inlet which is preferably frustoconical and the needle preferably has a summit angle between 80 and 100° (typically, around 90°) for an angle between 90 and 110° (typically, around 100°) at the aperture inlet (where the line of contact can be found between the two elements regardless of the size of the aperture).

It has to be noticed that the ventilation aperture has not necessarily a constant section on its entire height (depth of the cover) and that in the context of the invention, it can be advantageously to vary its section (and thus its shape) according to the specifications (generally: according to the wanted performances for the flow rate). In particular in the case of a hollow cover and/or in several pieces as described previously, the ventilation aperture is actually composed of 2 apertures in the cover that are generally aligned: one aperture in the lower part of the cover and effectively capable of being closed off by the needle, and one aperture in its upper part, that opens into the venting circuit. In this variant it is advantageous that the cover is in 2 pieces (generally 2 plates substantially parallel) and that the lower part is standard (in shape and in the dimension of the aperture) and that the upper part varies according to the specifications (namely by the dimension and/or the shape of its aperture). It has been noted that this variant is advantageous since it makes it possible for an aperture of a given leaktightness (in the lower part of the cover) to increase the venting flow rate.

According to one particularly advantageous variant of the invention, the frustoconical inlet of the aperture is located at the lower end of a sort of chimney that extends inside the chamber and the length of which is typically of the order of mm. This variant makes it possible, in particular, more easily (without interference with the position of the needle) to combine other functions with this same aperture (for example to contribute to an OFP (or overfilling prevention) device or to a vacuum release path: see further on).

The valve according to the invention allows a liquid tank to be vented, both in normal operation and when filling. It does not have, as such, the function of preventing ingress of liquid in the event of a vehicle rolling over or being excessively tilted (ROV or Roll-Over Valve function). To provide this function, the means generally employed consist of a densed ball and/or a preloaded spring. A densed ball gives good results, in particular in combination with an apertured frustoconical dish. In the event of the tank being inclined, this ball moves in the frustoconical dish, drives the float upwards and causes the venting aperture to be closed off by the needle and the seal of the head of the valve even before the liquid level rises in the valve, thus completely preventing liquid from flowing into the venting circuit. In the event of the tank rolling over, the ball of densed material also pushes the float towards the closed position of the valve and, through gravity, keeps it in this position. The present invention gives particularly good results within the context of valves with a ROV function.

Generally, the valves having a large-diameter ventilation aperture (typically: European systems with a 4 mm diameter aperture) require a secondary closure member affixed between the needle and the ventilation aperture that can be moved with respect to both of these to provide a two-stage effect and allow rapid re-opening of the valve regardless of the pressure inside the tank. As explained previously, this secondary closure member is provided for this purpose with a secondary ventilation aperture having a smaller diameter. Typically, the diameter of this aperture is around 2 or even 3 mm.

This secondary closure member may have any geometry. Preferably, it is a cage clipped to the head of the float and of which the secondary ventilation aperture is pierced by a secondary needle intended to seal the main ventilation aperture in the top position. This needle/aperture is borne by the top of the cage, which also comprises various peripheral apertures, the purpose of which is to lighten it and prevent the retention of liquid.

In order to carry out the clipping operation, the float head and the cage are preferably provided with complementary reliefs. For this purpose, advantageously, the cage is in fact made from a plate provided with elongated and flexible hooked fingers and the float head preferably comprises at least one groove which may for example comprise an annular excrescence over which the fingers are forced (due to their flexibility, which must be sufficient for this purpose). Most particularly preferably, the float head comprises two such excrescences. Regarding the fingers, there are preferably at least 3 or even 4 of them.

Preferably, in this version with a secondary closure member, with a view to obtaining double sealing as with the valves of the aforementioned US patent, the main ventilation aperture will be provided with an elastomeric seal that ensures the leaktightness with the needle of the secondary closure member in its top position (i.e. when the float occupies its highest position in the chamber). A simple way of obtaining vacuum release in this version consists in providing openings in the cover that provide a vacuum release path, above this seal—preferably at its edge—so that, in the event of underpressure (in the tank relative to atmospheric pressure), it can be opened and achieve a pressure equilibrium on both sides of the cover (i.e. between the inside of the tank and the atmosphere via the ventilation system). Such a system is, for example, described in Patent FR 2766134, the content of which is, for this purpose, incorporated by reference in the present application.

The constituent elements of the valve according to the invention may be made of any material. Preferably, they are based on a thermoplastic. In this case, it is obviously convenient to choose the material or materials in such a way that they withstand the operating stresses. Of course, the materials chosen must be inert with respect to the liquids with which they have to be in contact, in particular inert with respect to fuels.

In particular in the case in which the liquid tank is a fuel tank made of plastic, most of the constituent elements of the valve according to the invention are also made of plastic. The term "plastic" is understood to mean any polymeric synthetic material, whether thermoplastic or thermosetting, which is in the solid state under ambient conditions, as well as blends of at least two of these materials. The intended polymers comprise both homopolymers and copolymers (especially binary or ternary copolymers). Examples of such copolymers are, non-limitingly: random copolymers, linear block copolymers, non-linear block copolymers, and graft copolymers. Thermoplastic polymers, including thermoplastic elastomers, and blends thereof are preferred.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, for the non-elastomeric parts of the valve according to the invention (i.e. the body of the float, the chamber and the cover), it is possible to use polyolefins, grafted polyolefins, thermoplastic polyesters, polyketones, polyamides and copolymers thereof.

One polymer often used in plastic fuel tanks is polyethylene, in particular high-density polyethylene (HDPE) possibly in a multilayer structure including a barrier layer (for example based on EVOH, or hydrolysed ethylene/vinyl acetate copolymer) or one with a surface treatment (fluorination or sulphonation for example) for the purpose of making it impermeable to the fuels for which it is intended. Consequently, when the valve according to the invention includes a cover, this is preferably based on HDPE, so as also to be welded to the tank. As for the other parts of the valve, these are preferably based on at least one hydrocarbon-impermeable plastic. Examples of such hydrocarbon-impermeable plastics are, non-limitingly: polyethylene terephthalate or polybutylene terephthalate, polyamides, polyketones and polyacetals. It should be noted that all these parts, the cover included, may be multilayer structures, comprising, for example, at least one high-density polyethylene layer and optionally a hydrocarbon barrier layer (on the surface or within said structures).

Regarding the elastomeric parts of the valve according to the invention (needle of the float and seal of the ventilation aperture, if necessary) fluoroelastomers give good results.

In the case of a plastic fuel tank, and in particular one based on HDPE, good results have been obtained with valves made from a thermoplastic that include a chamber, a cover and a float made of POM (polyoxymethylene) or PBT (polybutylene terephthalate), and a needle and a seal, where appropriate, made of a fluoroelastomer. These components are generally obtained by injection-moulding thermoplastics. Regarding the float in particular, it is advantageous to overmould the needle on the head of the float.

The valve according to the invention is advantageously intended to be connected to a ventilation circuit of a fuel tank. Therefore, the present invention also relates to a ventilation circuit for a fuel tank that includes a valve as described previously, and also to a fuel tank equipped with such a circuit. Preferably, in this circuit/tank, the valve is clipped into a ventilation coupling which may be made from any material, but preferably from HDPE in order to be able to be welded to the perimeter of an opening in a fuel tank that has an outer surface made from HDPE. Alternatively, this coupling may be made from a material that is better from a fuel-permeability viewpoint (e.g. POM) but that has an area that allows welding to HDPE (for example, a two-material part obtained by overmoulding, chemical keying, etc.).

In reality, the method for attaching and locating the coupling on the tank may be chosen from any normal manner suitable for the specific conditions. This coupling is generally intended to be connected to a ventilation line, connecting between them the various ventilation valves of the tank and the canister. Preferably a seal (for example, of the O-ring type) is inserted between the cover of the valve and the coupling, so as to ensure a leaktight join by clipping. The parts in question, and in particular the cover and/or the coupling, therefore preferably comprise at least one relief (groove or channel) used to support and block this seal. It should be noted that cheaper sealing, such as a weld for example, can be obtained in the case of compatible materials.

Alternatively, the cover of the valve and coupling may be made from one part welded to the perimeter of the opening. This variant is however less advantageous as the coupling is standard whereas the cover is not.

Indeed, to summarize the advantages and the applications of the present invention, it makes it possible, starting from a kit comprising identical (standard) floats and chambers, but interchangeable covers (principally having apertures of variable size and position) and optional intermediate parts (secondary closure member, elastomeric seal) to cover the whole range of specifications with a limited number of plastic parts, and therefore a limited number of moulds to manufacture them. Therefore this results in an economical design and manufacturing process.

FIG. 1 shows a venting valve comprising a coupling (1) that incorporates a venting tube (2); a chamber (3) which opens into the tank (not shown); and a float shown in the bottom position. This float comprises a body (4), a head (5) produced as one part with the body (4) and provided with an elastomeric frustoconical needle (6) overmoulded on the head (5). The waterline of the float is indicated by way of illustration.

The chamber (3) comprises a cover (7) provided with a chimney (8) extending downwards into the chamber and bearing the venting aperture (14). The float can be made to move by the rise of the liquid in the valve through an apertured plate (9) or, in the case of the tank being inclined, by displacement of a ROV ball (10) of densed material. The chamber (3) includes, in its upper part, small lateral openings (11) allowing the gases to flow but preventing substantial volumes of liquid from flowing. The chamber also includes an internal baffle (12) of annular shape, for the purpose of stopping any liquid entrained by the gases through the openings (11). It should be noted that the coupling (1) is extended downwards by an annular part (12'), also acting as a baffle, but externally. The internal and external baffles are also provided with openings (11') (11", not shown in this figure).

In the valve illustrated, the coupling (1) is produced as one part with the external baffle (12'), the internal baffle (12) being itself produced as one part with the cover (7) and then assembled by clipping into the chamber (3), the assembly then being clipped into the coupling (1). A toric seal (13) enables this connection to be made leaktight.

This valve has an optimized position of the openings respectively in the chamber (3) and in the baffles (12) (12'), the openings (11", 11 and 11') being offset by 90° respectively, going from the outer baffle (12') to the inner baffle (12) via the chamber (3).

This valve version is particularly suitable for American systems:
 flow-pressure specifications met by a small aperture (max. 2 mm) which reduces LCO;
 small aperture, therefore high re-opening pressure, even without a two-stage device; and
 vacuum release path generally positioned on the FLVV (Fill Limit Venting Valve or separate valve generally present in American ventilation systems that aims to set the maximum fill level of the tank).

In this valve, sealing is achieved simply between the elastomeric needle (6) of the float and the aperture (14) positioned in the upper part of the shaft.

Figure 2:
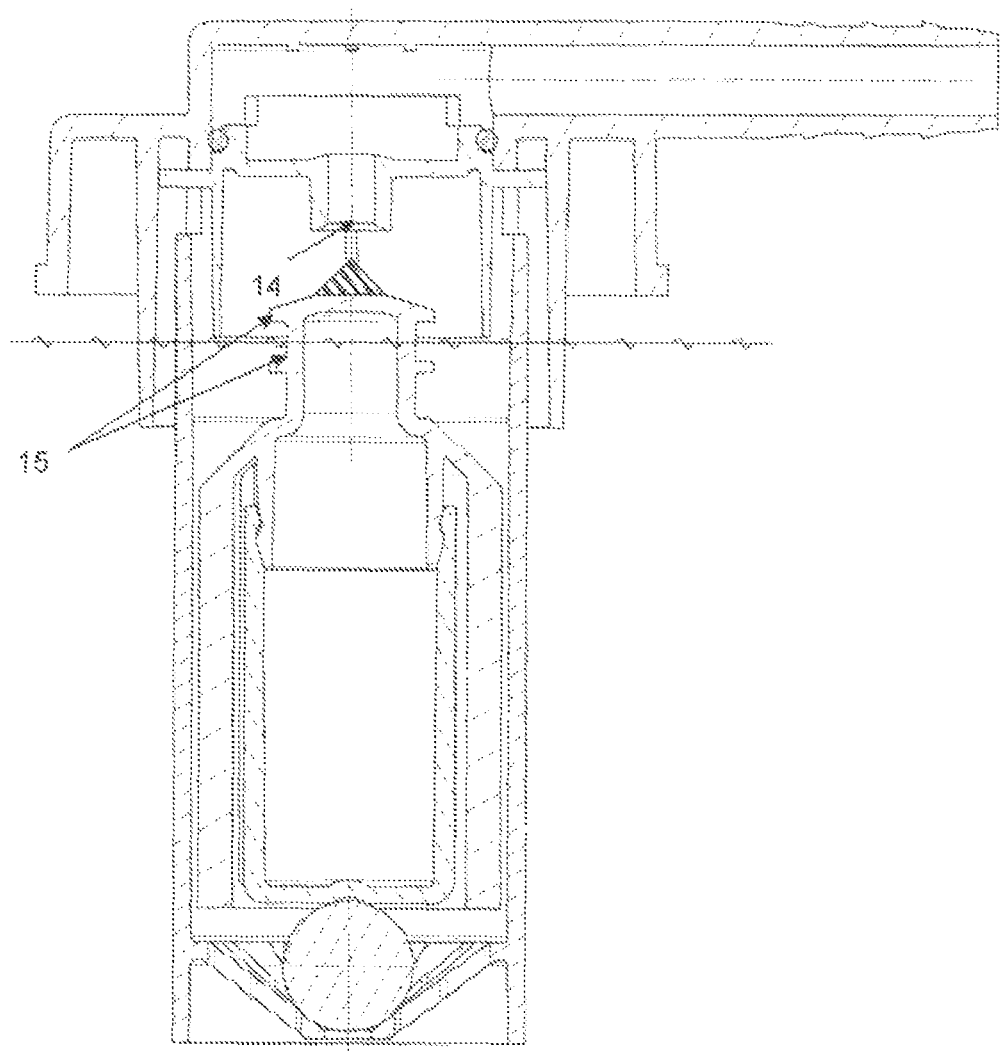
FIG. 2 shows an identical cross section but through a single-stage valve having a 4 mm ventilation aperture and a valve head of different geometry.

FIG. 2 illustrates a similar valve, but with a larger ventilation aperture. This version is particularly suitable for French systems:
 flow-pressure specifications require a large aperture (4 mm);
 re-opening pressure specification met without use of a two-stage device; and
 often coupled to a DC, the umbrella valve of which acts as a vacuum release path.

This valve also differs from that of FIG. 1 by the presence of annular excrescences (15) that make the valve even more modular in the sense that, as the following figures illustrate, these excrescences make it possible to cooperate with a secondary closure member (16), where appropriate, and to obtain a two-stage version of this same valve.

Figure 3:
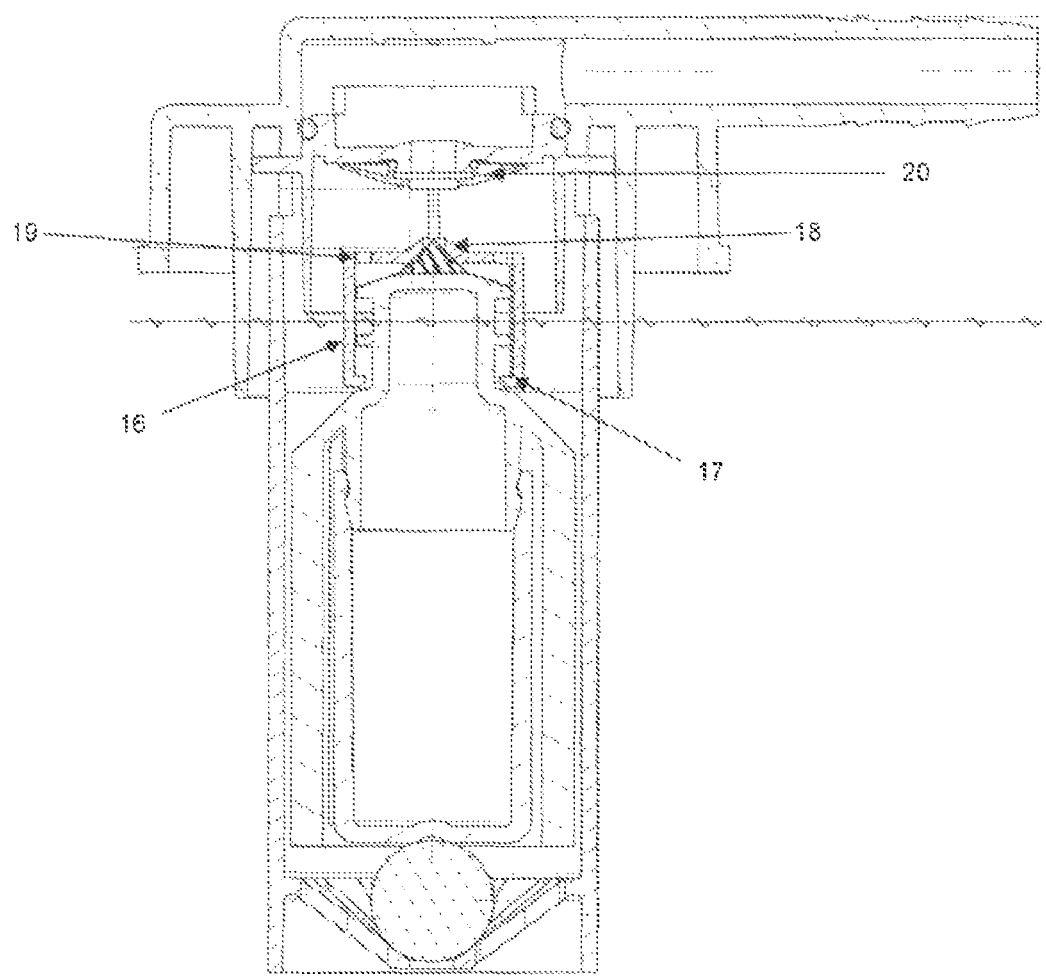
FIG. 3 shows an identical cross section but through a two-stage valve having a 4 mm ventilation aperture without a vacuum release path.

FIG. 3 precisely illustrates a more complex version of the valve according to the invention due to the introduction of a two-stage device. This makes it possible to be re-opened at high pressures despite the use of a large aperture (4 mm). It is composed of a secondary closure member (16) provided with a secondary needle (18) bearing a small aperture (of about 2 mm). Therefore, it is this one that opens first when the valve starts to open under a pressure which is still high. As this little hole re-opens, the pressures on both sides of the large aperture equalize very rapidly and the large aperture (14) also re-opens.

This version is particularly suitable for German systems where:
- the flow-pressure specifications require the use of a large aperture (4 mm); and
- the re-opening pressures demanded require the use of a two-stage device as the re-opening pressure on a 4 mm aperture is too low.

It should be noted that the closure member (16) also comprises lateral apertures (19) that have the effect of lightening it and preventing the fuel retention.

Sealing between the needle (18) and the ventilation aperture (14) is achieved thanks to a seal (20) affixed to the perimeter of said aperture.

Figure 4:
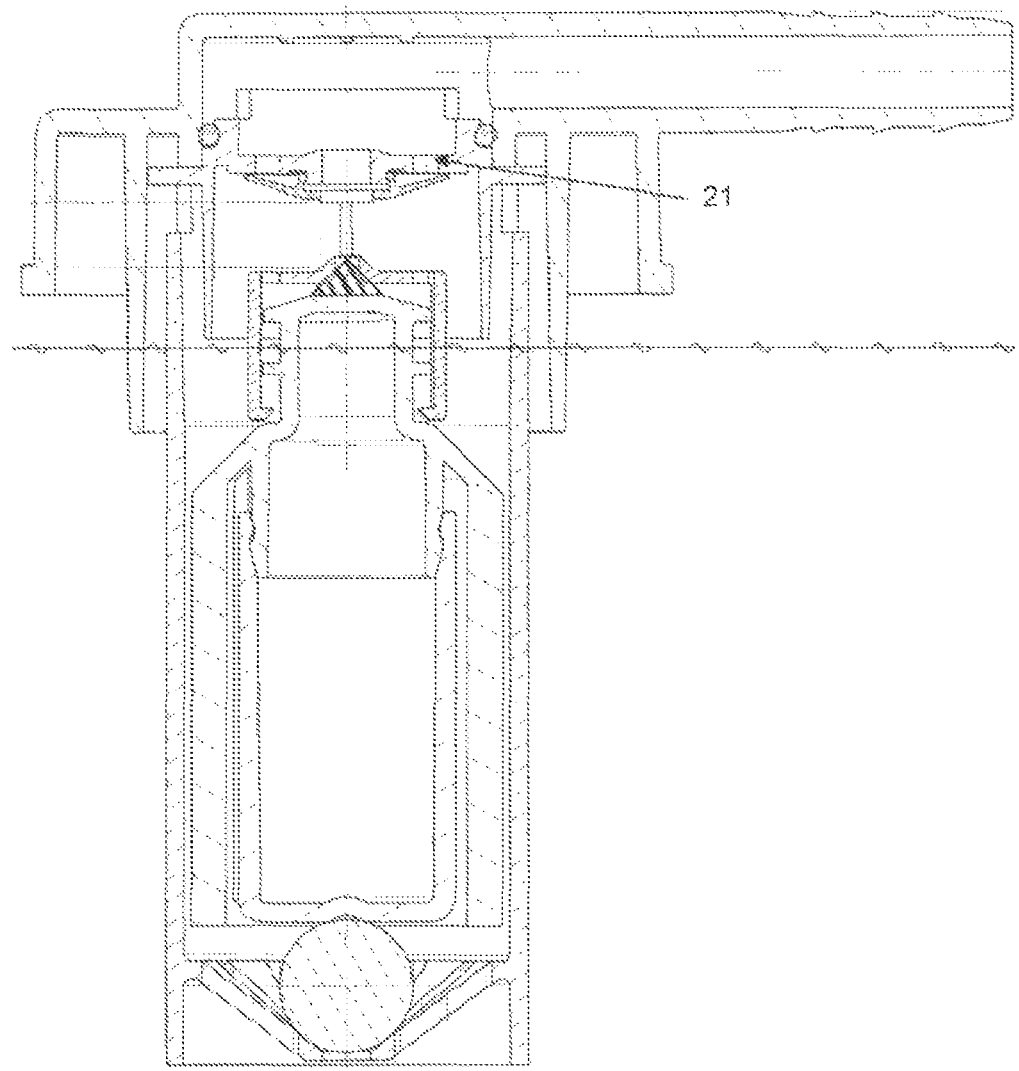
FIG. 4 shows an identical cross section through a valve identical to that in FIG. 3, but with a vacuum release path.

The version illustrated in FIG. 4 is the most complete. Here, the upper part of the shaft is pierced by secondary apertures (21) which allow the flow of air in the entering direction. Sealing of these apertures is provided in the exiting direction by the seal (20) introduced with the two-stage plate. The role of the vacuum release path is to allow air to enter into the tank when the vehicle is stationary (especially with the float which blocks the flow in the entering direction of the main ventilation aperture or when the valve is equipped with an OFP device).

Figure 5:
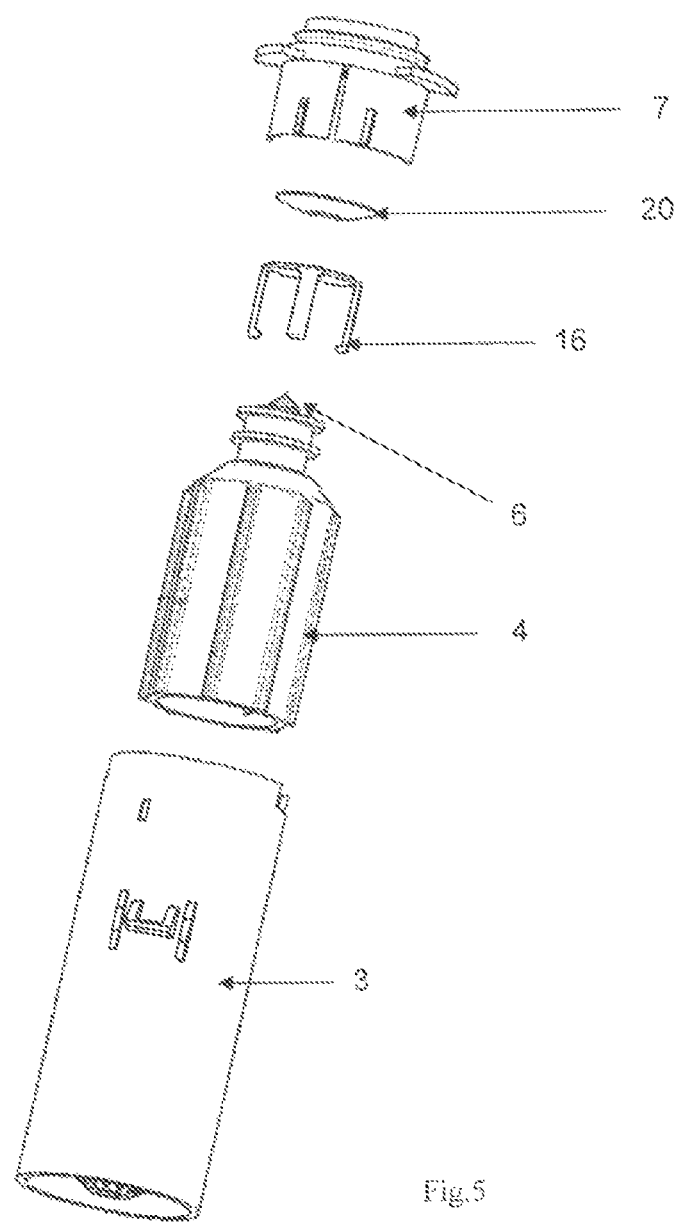
FIG. 5 shows an exploded view of a two-stage valve according to FIG. 3 or 4.

FIG. 5 illustrates the various components which, assembled, give a valve according to FIG. 3 or 4, namely:
- a chamber (3) provided with a base, identical in all versions of the valve;
- a float (4) with elastomeric needle (6), which is preferably also identical in all versions of the valve;
- a secondary closure member (16) that can be clipped to the head of the valve;
- a seal (20) for the two-stage version, which may also seal off the vacuum release path, where appropriate; and
- a cover (7), provided with a sealing (ventilation) aperture of variable size (not seen in this figure) and possibly being pierced by holes at the periphery of this aperture to provide a vacuum release path.

Figure 6:
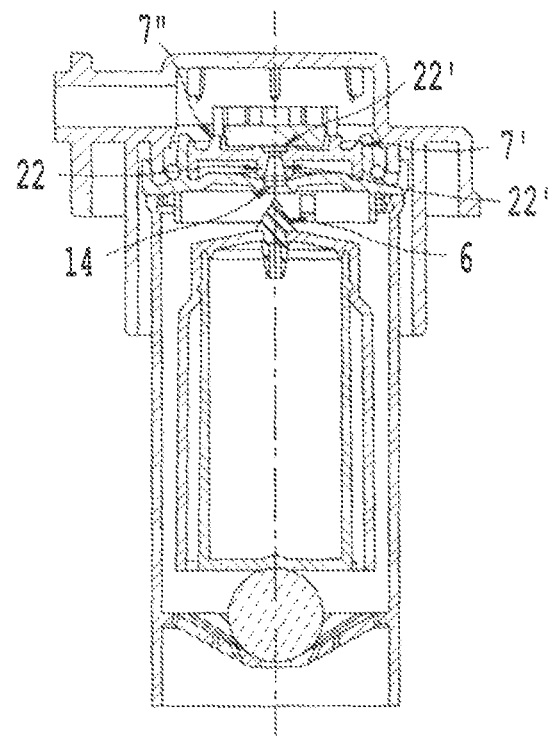
FIG. 6 shows an axial cross section through a single-stage valve having a 2-piece valve cover

The version illustrated in FIG. 6 represents a valve comprising a 2-piece valve cover (7', 7"). The ventilation aperture is actually composed of 2 apertures (14, 22) in the cover that are aligned. In this variant the lower part (7') is standard (in shape and in the dimension of the aperture (14)) and the upper part (7") varies according to the specifications (namely by the dimension and/or the shape of its aperture (22)). It is namely so that the aperture (14) in the lower part of the cover is effectively capable of being closed off by the needle (6) and has a standard dimension that is chosen so as to achieve leaktightness with the needle (6). The aperture (22) in the upper part of the cover opens into the venting circuit and has a dimension that is chosen so as to increase or decrease the venting flow rate. The aperture (22) has shape comprising a frustoconical inlet (22') (located on the float side) and a cylindrical outlet (22").

Figure 7:
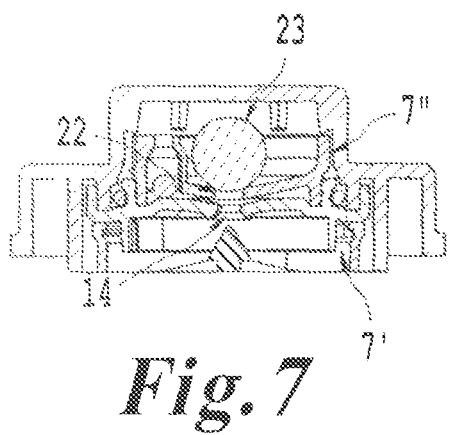
FIG. 7 shows a detail of the upper part of an identical cross section with an OPV

FIG. 7 shows a detail of the upper part of a valve comprising a 2-piece valve cover (7', 7") equipped with an OFP device. The ventilation aperture is actually composed of 2 apertures (14, 22) in the cover that are aligned. The OFP device consists of a densed ball (23) that normally closes the aperture (22) and may roll on a frustoconical part of piece (7") in the case of the tank being moving (e.g. the tank being inclined). In this variant the aperture (22) has a cylindrical shape with a cross section the dimension of with being greater than the cross section of the aperture (14) so as to achieve an increased venting flow rate.

Figure 8:
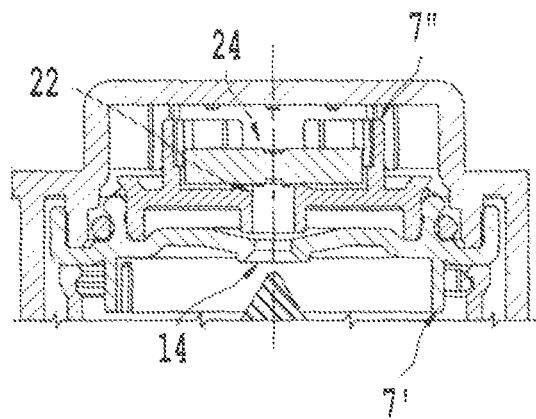
FIG. 8 shows a detail of the embodiment of FIG. 6

FIG. 8 shows a detail of the upper part of the valve described in FIG. 6. The aperture (22) is closed by a metal disk (24) that sits on the upper part (7") of the 2-piece valve cover and acts as an OFP device.

The invention claimed is:

1. A process for manufacturing a series of valves for a venting circuit of a liquid tank, these valves having variable ventilation adapted to different specifications and comprising:
   a) a chamber which comprises openings that allow liquid to penetrate into the chamber above a certain level in the tank and/or in the event of waves in the tank or the tank being turned upside down;
   b) a cover for the chamber comprising a main ventilation aperture that is susceptible to open into the venting circuit of the tank; and
   c) a float comprising a body and a needle capable of closing off the main ventilation aperture, said float being able to slide vertically inside the chamber depending on the level of liquid therein,
   wherein a needle is chosen that is frustoconical-shaped and based on an elastomeric material,
   wherein the chamber and float are kept the same whatever the specifications, and
   wherein only the cover, and the dimensions and/or the shape of the main ventilation aperture as a function of these specifications, are varied.

2. The process according to claim 1, wherein the valves comprise an internal baffle produced as one part with the cover and an external baffle produced as one part with a coupling connected to a ventilation line.

3. The process according to claim 1, wherein the main ventilation aperture comprises an inlet of frustoconical shape located at the lower end of a chimney that extends inside the chamber.

4. The process according to claim 1, wherein the valves comprise a secondary closure member affixed between the needle and the main ventilation aperture, wherein said secondary closure member is able to move relative to said needle and said main ventilation aperture, and is provided with a secondary ventilation aperture which has a smaller diameter than the main ventilation aperture.

5. The process according to claim 4, wherein the secondary closure member is a cage clipped to the head of the float and wherein the secondary ventilation aperture is pierced by a secondary needle to seal the main ventilation aperture in the top position.

6. The process according to claim 5, wherein:
   the float comprises a body and a head bearing the needle;
   the cage comprises a plate provided with elongated and flexible hooked fingers; and
   the head of the float comprises a groove.

7. The process according to claim 5, wherein the main ventilation aperture is provided with an elastomeric seal ensuring leaktightness with the needle of the secondary closure member in the top position.

8. The process according to claim 7, wherein the cover comprises openings located below the seal that open in the event of underpressure to produce a pressure equilibrium on both sides of the cover.

9. The process according to claim 1, wherein the valves are produced by injection moulding thermoplastics and wherein the needle is overmoulded on the float.

10. A valve resulting from a process according to claim 1, wherein the main ventilation aperture has a frustoconical inlet and wherein the needle has a summit angle between 80 and 100° for an angle between 90 and 110° at the aperture inlet.

11. A fuel tank made of high-density polyethylene and equipped with a ventilation circuit comprising a valve according to claim 10, said valve being clipped into a high-density polyethylene ventilation coupling welded onto the perimeter of an opening in the tank.

12. A fuel tank made of high-density polyethylene and equipped with a ventilation circuit comprising a valve obtained by the process according to claim 1, said valve being clipped into a high-density polyethylene ventilation coupling welded onto the perimeter of an opening in the tank.

* * * * *